Dec. 24, 1935.   O. SCHRAMM   2,025,617
TEMPERATURE MEASURING APPLIANCE FOR HOT FLUID MASSES
Filed Oct. 12, 1933
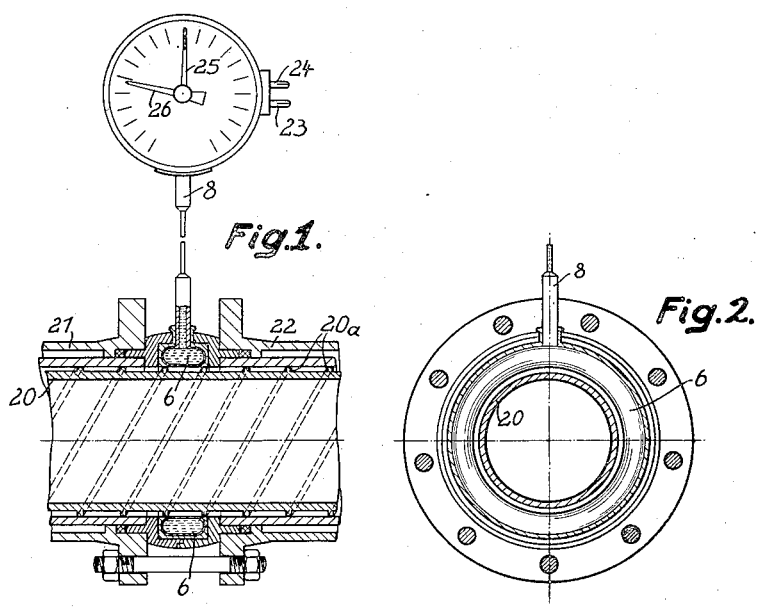
Inventor:
O. Schramm
By: Marks & Clark
      Attys.

Patented Dec. 24, 1935

2,025,617

UNITED STATES PATENT OFFICE 2,025,617

TEMPERATURE MEASURING APPLIANCE FOR HOT FLUID MASSES

Otto Schramm, Wernigerode-on-the-Harz, Germany

Application October 12, 1933, Serial No. 693,358
In Germany October 17, 1932

3 Claims. (Cl. 73—52)

This invention relates to a temperature-measuring appliance for hot fluid masses, sugar masses and like masses which tend to form heat insulating layers. A sufficiently accurate supervision of the temperature during the heat treatment, the so-called tempering of masses of the said kind, is attended by considerable difficulties when the usual temperature-measuring appliances are used, more particularly in that temperature range in which the supervision of the temperature requires particular attention, that is to say, in that temperature range in which chocolate, sugar and the like masses pass over by cooling from the liquid into the solid state. Under the condition in question the masses have a very strong tendency to deposit upon the heat-absorbing surface of the temperature-measuring appliance, e. g. the thermometer, forming layers which act as thermal insulators and consequently impair the heat transfer to the temperature-measuring appliance and as a result upset the working. This phenomenon is particularly bothersome in those cases in which the temperature-measuring appliance is used not so much for directly indicating the temperature of the mass being treated as for automatically controlling the flow of the heating and cooling media for effecting the heating or cooling, as the case may be, of the chocolate, sugar and like masses to be treated. In such cases the deposits formed on the heat-absorbing surface of the temperature-measuring appliance by the chocolate, sugar and the like masses, not only leads to a false temperature indication, but also results in a false regulation of the supply of the cooling and heating media, with the consequence that frequently operations are upset and losses occur.

According to the present invention this drawback is removed by an appliance for mechanically stripping off the deposit from the heat-absorbing surface of the measuring appliance. Such a stripping appliance preferably operates automatically in order to facilitate the attendance of the machine and to make the removal of the said disadvantage completely independent of the supervision of the machine attendants.

The accompanying drawing shows a constructional form of the application of the invention.

Figures 1 and 2 show an example of a stripping or scraping appliance for use with tempering machines having conveying worms rotating in a casing.

The stripping can be particularly advantageously effected in tempering machines having conveying worms rotated in a heated or cooled casing, that is to say, in tempering machines such as are described in my prior U. S. Patent application 607,213, filed April 23, 1932. In tempering machines of this type the stripping or scraping, for example, can be carried out by members which, at the same time, serve for other purposes, e. g. as stirring or conveying members. In the case of a tempering machine constructed according to my prior patent application just mentioned the stirring or conveying worms 20 may therefore at the same time effect the scraping action. For this purpose the heat absorbing part 6 of the thermometer 8, which, in the example shown, embraces the conveying worm 20 like a ring, is so adapted that the thread 20a continuously scrapes along the inner surface of the part 6 and so prevents the formation of heat-insulating layers, without it being necessary for the attendants to pay particular attention thereto or without even only one special driving arrangement being required. The heat-absorbing part 6 is installed between two parts 21 and 22 of the double-walled worm casing.

The automatic regulable control of the supply of heating or cooling medium to the hollow space between the two walls of the worm casing which has already been repeatedly mentioned above is here effected by means of the thermometer 8. This thermometer is provided with electrical pin contacts 23, 24 for insertion in an electric circuit. The circuit contains an electromagnet which is used for influencing either directly (as a relay) or indirectly, the valve inserted in the supply of cooling and heating media. One of the two pin contacts 23 and 24 of the thermometer 8 is connected to a pointer 25 serving as a stop, whilst the other pointer 26 influenced by the heat-absorbing part 6 is connected to the second pin contact. The two pointers 25 and 26 are insulated from one another so that in the position shown in Figure 1 the circuit is open. If the temperature rises the pointer 26 approaches the pointer 25 until eventually it makes contact with the pointer 25 and closes the circuit. The position of the pointer 25 is previously adjusted by hand. The closure of the circuit, that is to say, the attainment of the temperature to which the pointer 25 has been adjusted, effects a throttling of the supply of the heating medium, in some cases the free flow of the cooling medium supply, so that the temperature in the worm casing falls until the pointer 26 moves away from the pointer 25 again and interrupts the circuit. The details of this automatic regulation are likewise described in my prior U. S. Patent application No. 607,213 filed April 23, 1932.

What I claim is:—

1. In a machine for tempering chocolate sugar masses and like masses which tend to form thermally insulating layers having a tempering jacket, a conveying worm revolving in said jacket for forwarding and working the mass along the surface of said jacket, a thermometer appliance comprising a heat-absorbing element, said heat-absorbing element being disposed with reference to the conveying worm so that the thread of the latter cleans along the surface of said element as the worm revolves, for the purpose set forth.

2. In a machine for tempering chocolate and like masses having a conveying worm revolving in a casing for forwarding the chocolate or other mass, a thermometer appliance comprising in combination a ring-sectioned heat-absorbing element embracing the conveying worm in a ring-like manner and means for registering the temperature of the heat absorbed by said element, the thread of the worm scraping along the inner surface of said element as the worm revolves for the purpose set forth.

3. In a machine for tempering chocolate masses, sugar masses, and the like masses which tend to form thermally insulating layers, comprising in combination a tempering surface, a member for conveying and working the mass along said surface, a thermometer appliance having a heat-absorbing element, said element comprising a heat absorbing surface lying substantially in said tempering surface and in a position to be scraped by said conveying member, said member travelling along said tempering surface and thereby cleaning it.

OTTO SCHRAMM.